(12) United States Patent
Liu et al.

(10) Patent No.: US 10,885,237 B2
(45) Date of Patent: Jan. 5, 2021

(54) NETWORK SIMULATION DEVICE, NETWORK SIMULATION METHOD, AND NETWORK SIMULATION PROGRAM

(71) Applicant: Hitachi Industrial Equipment Systems Co., Ltd., Tokyo (JP)

(72) Inventors: Yaping Liu, Tokyo (JP); Tatsurou Yashiki, Tokyo (JP); Hideharu Tanaka, Tokyo (JP); Nobuhiro Tottori, Tokyo (JP); Yoriyuki Shinada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 361 days.

(21) Appl. No.: 15/555,427

(22) PCT Filed: Jan. 19, 2016

(86) PCT No.: PCT/JP2016/051368
§ 371 (c)(1),
(2) Date: Sep. 1, 2017

(87) PCT Pub. No.: WO2016/139979
PCT Pub. Date: Sep. 9, 2016

(65) Prior Publication Data
US 2018/0039719 A1     Feb. 8, 2018

(30) Foreign Application Priority Data

Mar. 4, 2015   (JP) .................................. 2015-042311

(51) Int. Cl.
*G06T 19/00*     (2011.01)
*G06F 30/18*     (2020.01)
(Continued)

(52) U.S. Cl.
CPC .............. *G06F 30/18* (2020.01); *G06F 30/13* (2020.01); *G06T 19/00* (2013.01); *G06F 2113/14* (2020.01)

(58) Field of Classification Search
CPC ...... G06T 19/00; B60R 16/0207; G01M 3/24; H04Q 9/00; G06F 17/509
See application file for complete search history.

(56) References Cited

U.S. PATENT DOCUMENTS

| 4,181,954 A | 1/1980 | Rosenthal et al. |
| 6,016,147 A | 1/2000 | Gantt |

(Continued)

FOREIGN PATENT DOCUMENTS

| JP | 2-254568 A | 10/1990 |
| JP | 7-262407 A | 10/1995 |

(Continued)

OTHER PUBLICATIONS

Extended European Search Report issued in counterpart European Application No. 16758675.9 dated Oct. 22, 2018 (10 pages).

(Continued)

*Primary Examiner* — Kandasamy Thangavelu
(74) *Attorney, Agent, or Firm* — Crowell & Moring LLP

(57) ABSTRACT

A network simulation device of the present invention: accepts an input of first plane information being positional information on a network projected onto a coordinate plane having any two dimensions out of three dimensions as coordinate axes; creates network model information which defines a coordinate value of the remaining one dimension as unknown based on the accepted first plane information; accepts selection of the element having the coordinate value defined as unknown by a user from the elements which appear in the first plane information; accepts an input of second plane information being positional information on (Continued)

the network projected onto a coordinate plane having any two dimensions including the remaining one dimension as coordinate axes; and determines a numerical value of the coordinate value defined as unknown of the selected element in the created network model information based on the accepted second plane information.

10 Claims, 15 Drawing Sheets

(51) Int. Cl.
    *G06F 30/13*         (2020.01)
    *G06F 113/14*     (2020.01)

(56) References Cited

U.S. PATENT DOCUMENTS

| | | |
|---|---|---|
| 6,195,624 B1 | 2/2001 | Woodman et al. |
| 2007/0089087 A1* | 4/2007 | Connor ................. G06F 17/509 717/105 |
| 2009/0040224 A1* | 2/2009 | Igarashi ................. G06T 19/00 345/427 |
| 2010/0305908 A1* | 12/2010 | Kidera ................. B60R 16/0207 703/1 |
| 2011/0137616 A1 | 6/2011 | Tognarelli et al. |
| 2012/0013483 A1* | 1/2012 | Jung ........................ H04Q 9/00 340/870.16 |
| 2013/0103370 A1 | 4/2013 | Barley et al. |
| 2016/0097746 A1* | 4/2016 | Traub ..................... G01M 3/24 702/39 |

FOREIGN PATENT DOCUMENTS

| | | |
|---|---|---|
| JP | 2009-258952 A | 11/2009 |
| JP | 2011-248703 A | 12/2011 |

OTHER PUBLICATIONS

International Search Report (PCT/ISA/210) issued in PCT Application No. PCT/JP2016/051368 dated Apr. 12, 2016 with English translation (4 pages).

Japanese-language Written Opinion (PCT/ISA/237) issued in PCT Application No. PCT/JP2016/051368 dated Apr. 12, 2016 (3 pages).

* cited by examiner

FIG. 3A
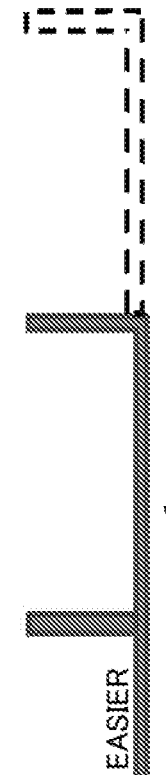
FIG. 3B
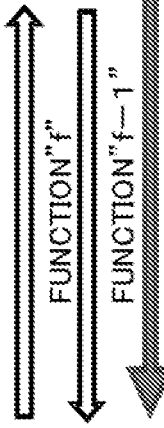
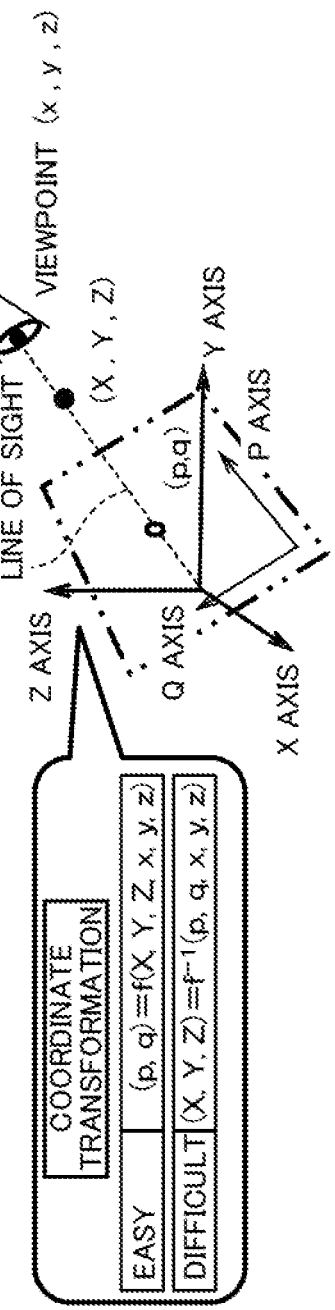

FIG. 4

| ELEMENT ID (111) | CATEGORY (112) | CLASS (113) | UPSTREAM ENDPOINT (114) | DOWNSTREAM ENDPOINT (115) | CONNECTION POINT (116) | UPSTREAM NODE ID (117) | DOWNSTREAM NODE ID (118) | CONNECTION LINE ID (119) |
|---|---|---|---|---|---|---|---|---|
| P01 | LINE | PIPE | (X, Y, ?) | (X, Y, ?) | — | C12 | B20 | — |
| P02 | LINE | PIPE | (X, Y, ?) | (X, Y, ?) | — | B20 | E16 | — |
| P03 | LINE | PIPE | (X, Y, ?) | (X, Y, ?) | — | E16 | B21 | — |
| P04 | LINE | PIPE | (X, Y, ?) | (X, Y, ?) | — | B21 | E17 | — |
| P05 | LINE | PIPE | (X, Y, ?) | (X, Y, ?) | — | E17 | B22 | — |
| P06 | LINE | PIPE | (X, Y, ?) | (X, Y, ?) | — | B18 | B22 | — |
| P07 | LINE | PIPE | (X, Y, ?) | (X, Y, ?) | — | B23 | E18 | — |
| P08 | LINE | PIPE | (X, Y, ?) | (X, Y, ?) | — | E19 | B23 | — |
| P09 | LINE | PIPE | (X, Y, ?) | (X, Y, ?) | — | B20 | M13 | — |
| P10 | LINE | PIPE | (X, Y, ?) | (X, Y, ?) | — | B21 | M15 | — |
| P11 | LINE | PIPE | (X, Y, ?) | (X, Y, ?) | — | B23 | M14 | — |
| P99 | LINE | PIPE | (X, Y, ?) | (X, Y, ?) | — | B22 | — | — |
| C12 | NODE | COMPRESSOR | — | — | (X, Y, ?) | — | — | P01 |
| M13 | NODE | TERMINAL INSTRUMENT | — | — | (X, Y, ?) | — | — | P10 |
| M14 | NODE | TERMINAL INSTRUMENT | — | — | (X, Y, ?) | — | — | P99 |
| M15 | NODE | TERMINAL INSTRUMENT | — | — | (X, Y, ?) | — | — | P11 |
| B20 | NODE | BRANCH | — | — | (X, Y, ?) | — | — | P01, P02, P09 |
| B21 | NODE | BRANCH | — | — | (X, Y, ?) | — | — | P03, P04, P10 |
| B22 | NODE | BRANCH | — | — | (X, Y, ?) | — | — | P05, P06, P99 |
| B23 | NODE | BRANCH | — | — | (X, Y, ?) | — | — | P07, P08, P11 |
| E16 | NODE | ELBOW | — | — | (X, Y, ?) | — | — | P02, P03 |
| E17 | NODE | ELBOW | — | — | (X, Y, ?) | — | — | P04, P05 |
| E18 | NODE | ELBOW | — | — | (X, Y, ?) | — | — | P06, P07 |
| E19 | NODE | ELBOW | — | — | (X, Y, ?) | — | — | P08, P09 |

FIG. 5

| ELEMENT ID (111) | CATEGORY (112) | CLASS (113) | UPSTREAM ENDPOINT (114) | DOWNSTREAM ENDPOINT (115) | CONNECTION POINT (116) | UPSTREAM NODE ID (117) | DOWNSTREAM NODE ID (118) | CONNECTION LINE ID (119) | INSTRUMENT ATTRIBUTE (120) | |
|---|---|---|---|---|---|---|---|---|---|---|
| P01 | LINE | PIPE | (X, Y, 0) | (X, Y, 0) | – | C12 | B20 | – | LENGTH=··, DIAMETER=··, MATERIAL=·· | |
| P02 | LINE | PIPE | (X, Y, 0) | (X, Y, 0) | – | B20 | E16 | – | LENGTH=··, DIAMETER=··, MATERIAL=·· | |
| ··· | | | | | | | | | | |
| P99 | LINE | PIPE | (X, Y, Z) | (X, Y, Z) | – | B22 | M14 | | DELETED | DELETED |
| P31 | LINE | PIPE | (X, Y, 0) | (X, Y, 0) | – | B22 | E38 | – | LENGTH=··, DIAMETER=··, MATERIAL=·· | ADDED |
| P32 | LINE | PIPE | (X, Y, 0) | (X, Y, Z) | – | E38 | V37 | – | LENGTH=··, DIAMETER=··, MATERIAL=·· | ADDED |
| P33 | LINE | PIPE | (X, Y, Z) | (X, Y, Z) | – | V37 | E39 | – | LENGTH=··, DIAMETER=··, MATERIAL=·· | ADDED |
| P34 | LINE | PIPE | (X, Y, Z) | (X, Y, 0) | – | E39 | E40 | – | LENGTH=··, DIAMETER=··, MATERIAL=·· | ADDED |
| P35 | LINE | PIPE | (X, Y, 0) | (X, Y, 0) | – | E40 | E41 | – | LENGTH=··, DIAMETER=··, MATERIAL=·· | ADDED |
| P36 | LINE | PIPE | (X, Y, 0) | (X, Y, 0) | – | E41 | M14 | – | LENGTH=··, DIAMETER=··, MATERIAL=·· | ADDED |
| C12 | NODE | COMPRESSOR | – | – | (X, Y, 0) | – | – | P01 | MODEL=··, DISCHARGED AIR PRESSURE=·· | |
| M13 | NODE | TERMINAL INSTRUMENT | – | – | (X, Y, 0) | – | – | P10 | USE PRESSURE=·· | |
| M14 | NODE | TERMINAL INSTRUMENT | – | – | (X, Y, 0) | – | – | P36 | USE PRESSURE=·· | |
| M15 | NODE | TERMINAL INSTRUMENT | – | – | (X, Y, 0) | – | – | P11 | USE PRESSURE=·· | |
| B20 | NODE | BRANCH | – | – | (X, Y, 0) | – | – | P01, P02, P09 | TYPE=·· | |
| B21 | NODE | BRANCH | – | – | (X, Y, 0) | – | – | P03, P04, P10 | TYPE=·· | |
| B22 | NODE | BRANCH | – | – | (X, Y, 0) | – | – | P05, P06, P31 | TYPE=·· | |
| B23 | NODE | BRANCH | – | – | (X, Y, 0) | – | – | P07, P08, P11 | TYPE=·· | |
| E16 | NODE | ELBOW | – | – | (X, Y, 0) | – | – | P02, P03 | – | |
| E17 | NODE | ELBOW | – | – | (X, Y, 0) | – | – | P04, P05 | – | |
| E18 | NODE | ELBOW | – | – | (X, Y, 0) | – | – | P06, P07 | – | |
| E19 | NODE | ELBOW | – | – | (X, Y, 0) | – | – | P08, P09 | – | |
| E38 | NODE | ELBOW | – | – | (X, Y, 0) | – | – | P31, P32 | – | ADDED |
| E39 | NODE | ELBOW | – | – | (X, Y, Z) | – | – | P33, P34 | – | ADDED |
| E40 | NODE | ELBOW | – | – | (X, Y, 0) | – | – | P34, P35 | – | ADDED |
| E41 | NODE | ELBOW | – | – | (X, Y, 0) | – | – | P35, P36 | – | ADDED |
| V37 | NODE | VALVE | – | – | (X, Y, Z) | – | – | P32, P33 | DIAMETER=··, TYPE=·· | ADDED |

FIG. 6

| ELEMENT ID | CATEGORY | CLASS | ... | INSTRUMENT ATTRIBUTE | ANALYSIS CONDITION | SIMULATION RESULT |
|---|---|---|---|---|---|---|
| P01 | LINE | PIPE | | LENGTH=··, DIAMETER=··, MATERIAL=·· | — | FLOW RATE=··, PRESSURE LOSS=··, TEMPERATURE=·· |
| P02 | LINE | PIPE | | LENGTH=··, DIAMETER=··, MATERIAL=·· | — | FLOW RATE=··, PRESSURE LOSS=··, TEMPERATURE=·· |
| ·· | | | | | | |
| P31 | LINE | PIPE | | LENGTH=··, DIAMETER=··, MATERIAL=·· | | FLOW RATE=··, PRESSURE LOSS=··, TEMPERATURE=·· |
| P32 | LINE | PIPE | | LENGTH=··, DIAMETER=··, MATERIAL=·· | | FLOW RATE=··, PRESSURE LOSS=··, TEMPERATURE=·· |
| P33 | LINE | PIPE | | LENGTH=··, DIAMETER=··, MATERIAL=·· | — | FLOW RATE=··, PRESSURE LOSS=··, TEMPERATURE=·· |
| P34 | LINE | PIPE | | LENGTH=··, DIAMETER=··, MATERIAL=·· | | FLOW RATE=··, PRESSURE LOSS=··, TEMPERATURE=·· |
| P35 | LINE | PIPE | | LENGTH=··, DIAMETER=··, MATERIAL=·· | | FLOW RATE=··, PRESSURE LOSS=··, TEMPERATURE=·· |
| P36 | LINE | PIPE | | LENGTH=··, DIAMETER=··, MATERIAL=·· | — | FLOW RATE=··, PRESSURE LOSS=··, TEMPERATURE=·· |
| C12 | NODE | COM-PRESSOR | | MODEL=··, DISCHARGED AIR PRESSURE=·· | TEMPERATURE=··, PRESSURE=··, RELATIVE HUMIDITY=·· | FLOW RATE=··, TEMPERATURE=·· |
| M13 | NODE | TERMINAL INSTRUMENT | | USE PRESSURE=·· | USE RATE OF AIR=··, USE PRESSURE=·· | FLOW RATE=··, PRESSURE=··, TEMPERATURE=·· |
| M14 | NODE | TERMINAL INSTRUMENT | | USE PRESSURE=·· | USE RATE OF AIR=··, USE PRESSURE=·· | FLOW RATE=··, PRESSURE=··, TEMPERATURE=·· |
| M15 | NODE | TERMINAL INSTRUMENT | | USE PRESSURE=·· | USE RATE OF AIR=··, USE PRESSURE=·· | FLOW RATE=··, PRESSURE=··, TEMPERATURE=·· |
| B20 | NODE | BRANCH | | TYPE=·· | — | PRESSURE=··, TEMPERATURE=·· |
| B21 | NODE | BRANCH | | TYPE=·· | — | PRESSURE=··, TEMPERATURE=·· |
| B22 | NODE | BRANCH | | TYPE=·· | — | PRESSURE=··, TEMPERATURE=·· |
| B23 | NODE | BRANCH | | TYPE=·· | — | PRESSURE=··, TEMPERATURE=·· |
| E16 | NODE | ELBOW | | | — | PRESSURE=··, TEMPERATURE=·· |
| E17 | NODE | ELBOW | | | — | PRESSURE=··, TEMPERATURE=·· |
| E18 | NODE | ELBOW | | | — | PRESSURE=··, TEMPERATURE=·· |
| E19 | NODE | ELBOW | | | — | PRESSURE=··, TEMPERATURE=·· |
| E38 | NODE | ELBOW | | | — | PRESSURE=··, TEMPERATURE=·· |
| E39 | NODE | ELBOW | | | — | PRESSURE=··, TEMPERATURE=·· |
| E40 | NODE | ELBOW | | | — | PRESSURE=··, TEMPERATURE=·· |
| E41 | NODE | ELBOW | | | — | PRESSURE=··, TEMPERATURE=·· |
| V37 | NODE | VALVE | | DIAMETER=··, TYPE=·· | — | FLOW RATE=··, PRESSURE LOSS=··, TEMPERATURE=·· |

NETWORK SIMULATION DEVICE, NETWORK SIMULATION METHOD, AND NETWORK SIMULATION PROGRAM

TECHNICAL FIELD

The present invention relates to a network simulation device, a network simulation method, and a network simulation program.

BACKGROUND ART

There has recently been a demand for reduction in power consumption of production sites, following the trend of reducing power consumption in the form of preventing global warming and conserving energy. A production site such as a factory has various types of facilities, and these different types of facilities have various power sources. Compressed air, which is obtained by compressing the atmospheric air, is easily available, and is thus widely used as a power source for driving, for example, a pneumatic tool, a pneumatic press, a pneumatic brake, and a spray gun. Note that hereinafter, an instrument driven with compressed air is referred to as a "terminal instrument." Compressed air is produced with a compressor and is supplied to terminal instruments via a pipe network provided in a factory. It is said in general that the power consumption of the compressor accounts for 20% to 30% of that of the entire factory. Hence, it is important to reduce power consumed by the compressor from the viewpoint not only of environmental sustainment and resource conservation, but also of corporate management.

It has been demonstrated that a pressure loss of 100 KPa in the pipe network of a factory increases the power consumption of the compressor by approximately 7%. In light of this, it is important to know how much pressure could potentially be lost in the pipe network and to take measure to avoid a pressure loss. A computer aided design (CAD) device of Patent Literature 1 is equipped with a pressure loss calculation function for a flow path model. The CAD device creates a flow path model with an input function which the device itself originally provides as a CAD device. The device displays the flow path model on a screen, accepts selection of a system constituting the flow path model by a user, and calculates the pressure loss of the system.

PATENT LITERATURE

Patent Literature 1: Japanese Patent Application Publication No. 2011-248703 (FIG. 14)

SUMMARY OF INVENTION

Technical Problem

It is necessary to strictly reflect the layout of an actual pipe network in a pipe network model in order to enhance calculation accuracy of the flow of compressed air through the pipe network. The actual pipe network of a factory or the like includes an "upflow" part and a "downflow" part and is arranged three dimensionally in order to avoid obstacles. A user of the CAD device of Patent Literature 1 creates a pipe network model (flow path model) based on a pipe network arranged three dimensionally. To this end, it is necessary for the user to perform three-dimensional operations on the CAD device. It requires significant effort for the user to acquire expertise on the three-dimensional operations on the CAD device.

Given the above circumstances, the present invention aims to create a network model easily and promptly without three-dimensional operations.

Solution to Problem

A network simulation device of the present invention includes: a storage unit which stores network model information which stores three-dimensional coordinate values of each of elements constituting a network; and a control unit which accepts an input of first plane information being positional information on the network projected onto a coordinate plane having any two dimensions out of three dimensions as coordinate axes, creates the network model information which defines a coordinate value of the remaining one dimension as unknown based on the accepted first plane information, accepts selection of the element having the coordinate value defined as unknown by a user from the elements which appear in the first plane information, accepts an input of second plane information being positional information on the network projected onto a coordinate plane having any two dimensions including the remaining one dimension as coordinate axes, and determines a numerical value of the coordinate value defined as unknown of the selected element in the created network model information based on the accepted second plane information.

Other methods are described in embodiments.

Advantageous Effects of Invention

The present invention makes it possible to create a network model easily and promptly without three-dimensional operations.

BRIEF DESCRIPTION OF DRAWINGS

FIGS. 3A and 3B are diagrams illustrating a relationship between two-dimensional coordinate values and three-dimensional coordinate values.

FIG. 4 is a diagram illustrating an example of pipe network model information (#1).

FIG. 6 is a diagram illustrating an example of pipe network model information (#2).

FIG. 6 is a diagram illustrating an example of pipe network model information (#3).

DESCRIPTION OF EMBODIMENTS

Hereinafter, three embodiments of the present invention are described in detail with reference to the drawings and the like. The three embodiments are a first embodiment as a basic form, and a second embodiment and a third embodiment both as an application form (simplified form). Although the details are described later, the difference between these forms results from the difference in how a model information creation unit (details thereof are described later) processes information. To be concise, the difference results from the difference in the process of reflecting an "upflow" part and a "downflow" part of a pipe in pipe network model information. The first embodiment is described in the beginning, and after that, the second embodiment and the third embodiment are described paying attention to the difference between the first embodiment and the set of the second and third embodiments.

In the following, the three embodiments are described taking as an example a pipe network which supplies compressed air. The present invention is also applicable to a pipe network which supplies a fluid other than compressed air, however. Moreover, the present invention is also applicable to e.g. a conductive wire (such as a wire harness) which allows a signal and power to pass through. To sum up, the present invention is applicable to a structure in which line-shaped members are connected to one another to form a network as a whole.

First Embodiment (Network Simulation Device)

Figure 1:
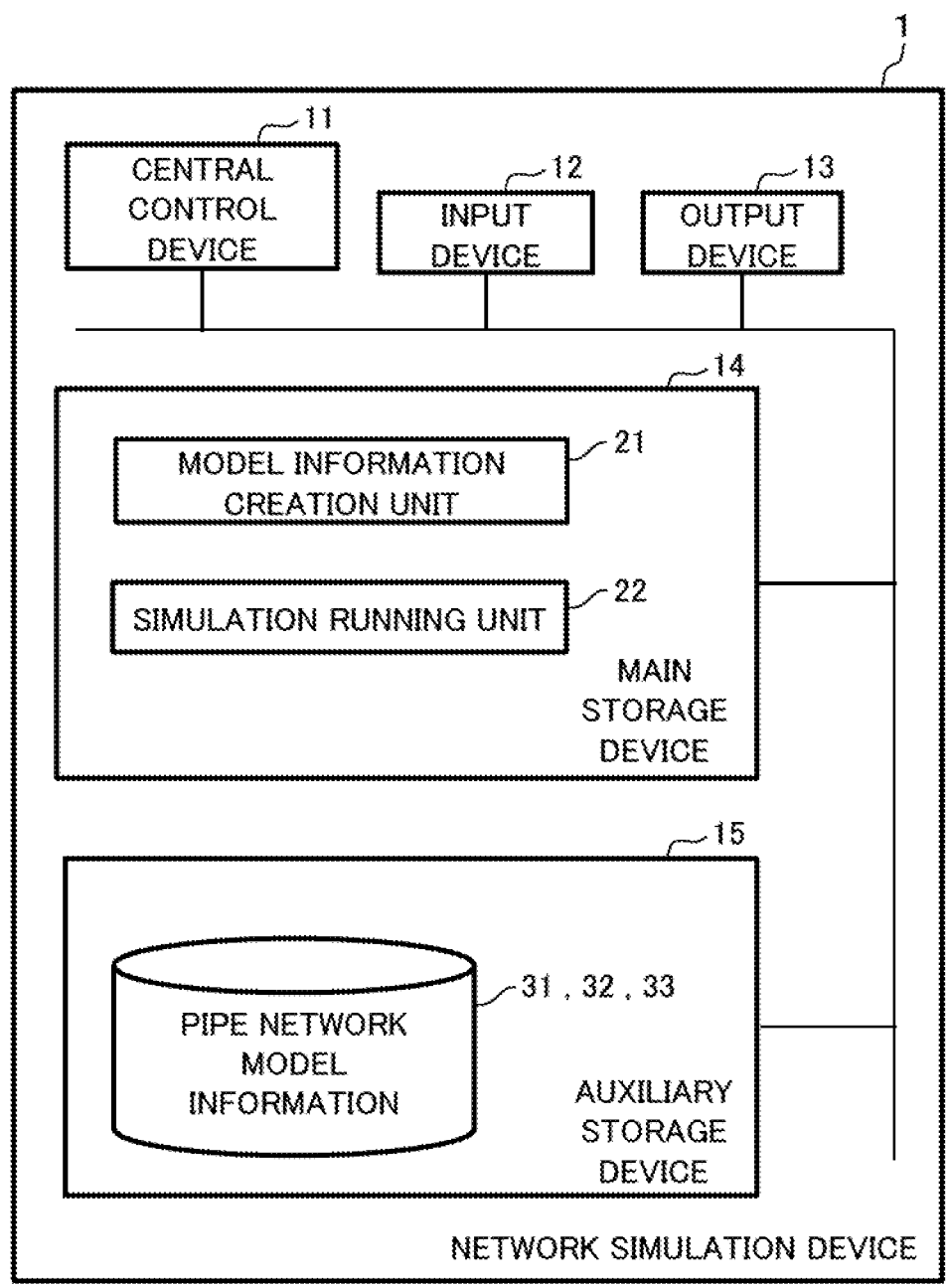
FIG. 1 is a diagram illustrating a configuration of a network simulation device.

A configuration of a network simulation device 1 is described along with FIG. 1. The network simulation device 1 (hereinafter also referred to as the "NWS (network simulation) device") is operated by, for example, a corporation which owns a factory or a service company which services a factory. The NWS device 1 is a general computer, and includes a central control device 11, an input device 12, an output device 13, a main storage device 14, and an auxiliary storage device 15. These devices are connected to one another via a bus.

The auxiliary storage device 15 stores pipe network model information 31, 32, and 33 (their details are described later). A model information creation unit 21 and a simulation running unit 22 in the main storage device 14 are each a program. In the following, a "* unit" used as the subject of a sentence means that the central control device 11 reads programs from the auxiliary storage device 15, loads the programs onto the main storage device 14**, and executes the functions of the programs (their details are described later).

(Pipe Network Model)

Figure 2:
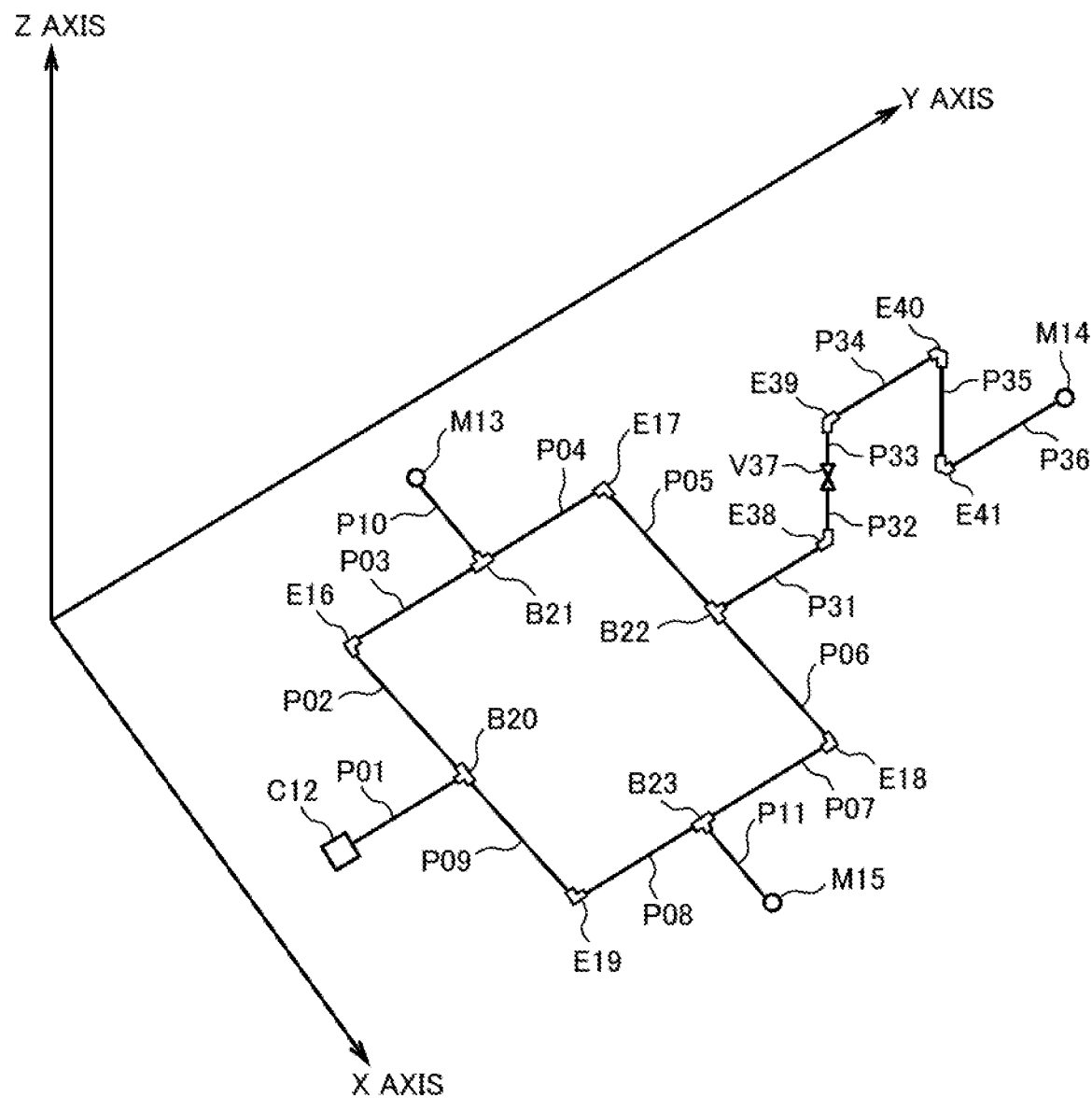
FIG. 2 is a diagram illustrating an example of a pipe network model.

A pipe network model is described along with FIG. 2. The pipe network model is a schematic diagram of an actual pipe network arranged (rendered) in a virtual three-dimensional space. Each of the elements of the pipe network (immediately described later) has three-dimensional coordinate values (an X-axis coordinate value, a Y-axis coordinate value, and a Z-axis coordinate value). For this reason, the NWS device 1 can arrange the elements in the virtual three-dimensional space. FIG. 2 is a diagram of the pipe network projected onto a plane by a ray of light which is parallel to a line of sight passing through a certain viewpoint.

(Elements of Pipe Network)

The pipe network has six types of elements: a "compressor," a "terminal device," a "pipe," a "branch," an "elbow," and a "valve."

The "compressor" is an instrument which produces compressed air whose pressure is higher than the atmosphere. The reference sign C12 in FIG. 2 corresponds to the compressor.

As described above, the "terminal instrument" is an instrument which is driven by compressed air. Each of the reference signs M13 to M15 in FIG. 2 corresponds to the terminal device. Note that compressed air is supplied from the compressor C12 to the terminal instruments M13 to M15.

The "pipe" is a pipe which supplies compressed air. Each of the reference signs P01 to P11 and P31 to P36 in FIG. 2 corresponds to the pipe. The pipe network usually has multiple pipes. Each of the pipes is connected via the "branch," the "elbow," (immediately described later) etc.

The "branch" is a member which connects three or more pipes together. Each of the reference signs B20 to B23 in FIG. 2 corresponds to the branch. The "branch" usually has the shape of "T," but the angle of the branch is not always 90 degrees. At the branch, one flow of compressed air divides into two flows (reference signs B20, B21, and B23) or two flows meet to form one flow (reference sign B22).

The "elbow" is a member which connects two pipes together. Each of the reference signs E16 to E19 and E38 to E41 in FIG. 2 corresponds to the elbow. The "elbow" usually has the shape of "L," but the bending angle is not always 90 degrees.

The "valve" is an instrument which is provided between pipes and which controls the flow rate of compressed air. The reference sign Y37 in FIG. 2 corresponds to the valve.

(Upflow, Downflow)

The pipes P32 and P33 flow upward perpendicularly to an XY plane. The pipe P35 flows downward perpendicularly to the XY plane. The difference between "downflow" and "upflow" results solely from the flow direction of compressed air. All of these pipes are undoubtedly perpendicular to the XY plane. With the above in mind, both the "downflow" and the "upflow" are hereinafter referred to as the "upflow" in a representative manner.

Figure 11A:
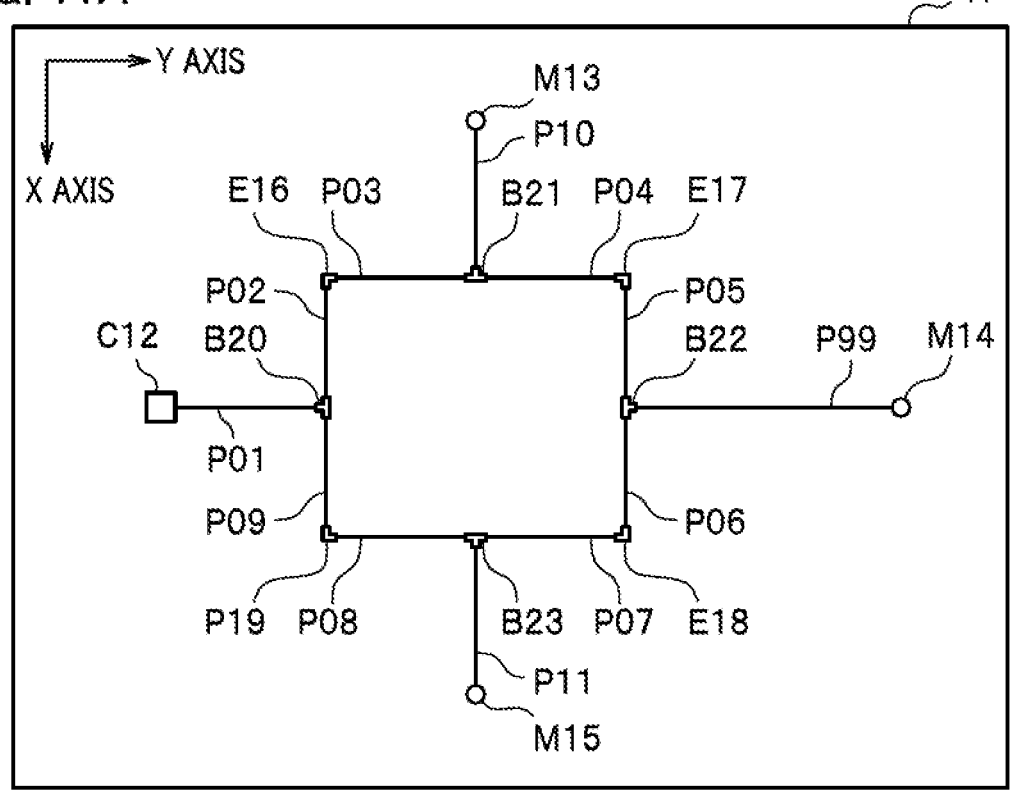
FIG. 11A is a diagram illustrating an example of a first plan view.

FIG. 11A illustrates the pipe network projected onto the XY plane by parallel rays of light coming from the positive Z-axis direction. The pipes P32, P33, and P35 in FIG. 2 vanish in FIG. 11A, and hence the user cannot see these pipes. This is the case with the valve V37. In FIG. 2, the pipe P34 is not directly connected to the pipes P31 and P36. In FIG. 11A, however, the pipes P31, P34, and P36 in FIG. 2 appear as a single pipe P99.

It is necessary to distinguish and call the elements in the embodiment depending on how they look. As in the case of the pipe P99 in FIG. 11A an element which does not actually exist and which appears as an apparent element on the projection plane is referred to as an "imaginary element." On the other hand, as in the case of the elements P31, E38, P32, V37, P33, E39, P34, E40, P35, E40, and P36 in FIG. 2, an element which actually exists is referred to as a "real element." Two or more real elements are hidden in an imaginary element.

Since FIG. 11A has only two-dimensional information, the processing load on the NWS device 1 is relatively low. Thus, it is important to input two-dimensional information such as FIG. 11A to the NWS device 1 and to let the NWS device 1 to efficiently recognize upflow parts which are exceptional in the entire network.

(Relationship between Three-Dimensional Coordinate Values and Two-Dimensional Coordinate Values)

The relationship between three-dimensional coordinate values and two-dimensional coordinate values is described along with FIG. 3A and FIG. 3B. The NWS device 1 models a pipe network which actually exists and runs various simulations on the pipe network. As the premise, the user of the NWS device 1 has to input three-dimensional coordinate values which represent positional information of each element to the NWS device 1.

(Three-Dimensional Coordinate Values)

Refer to FIG. 3A. In most cases, a skilled user uses a CAD device in the design of a pipe network to create three-dimensional coordinate values 101 of each element. These three-dimensional coordinate values include all of the X-axis coordinate value, the Y-axis coordinate value, and the Z-axis coordinate value of each element. The three-dimensional coordinate values of a pipe (line) are a combination of the three-dimensional coordinate values of its upstream endpoint and the three-dimensional coordinate values of its downstream endpoint. The branch and the elbow (node) are each an element which connects two or more pipes together. Taking this into consideration, the three-dimensional coordinate values of the branch or the elbow are the three-dimensional coordinate values of the connection point of these pipes. In this case, no problem arises if a skilled user operates the three-dimensional coordinate values and directly inputs the three-dimensional coordinate values to the NWS device 1.

In FIG. 3A, for example, the three-dimensional coordinate values of the upstream endpoint of the element PQ1 are written in the form of "(X, Y, Z)," and the three-dimensional coordinate values of the downstream endpoint are also written in the form of "(X, Y, Z)." This form does not mean that both the endpoints have the same coordinate values, but that the endpoints have different specific coordinate values in a representative manner. Needless to say, if two pipes branch from a point, the upstream endpoints of these two pipes have the same three-dimensional coordinate values. The same applies to FIG. 4 to FIG. 6, too.

(Two-Dimensional Coordinate Values)

In most cases, the three-dimensional coordinate values are used being projected onto at least one of the XY plane, the YZ plane, and the XZ plane, i.e. by reducing the dimensionality by one. In the case of projecting an element onto the XY plane, for example, the NWS device 1 deletes the unnecessary Z-axis coordinate value from the three-dimensional coordinate values to create a coordinate value 103 projected onto the XY plane. The same applies to a coordinate value 104 projected onto the YZ plane and a coordinate value 105 projected onto the XZ plane.

It is theoretically easy to create the three-dimensional coordinate values 101 based on at least two of the coordinate value 103 projected onto the XY plane, the coordinate value 104 projected onto the YZ plane, and the coordinate value 105 projected onto the XZ plane. In reality, however, an unskilled user spends much time to perform this work (to pick up the coordinate values and compare them for each element). In particular, the user may perform useless work if many of the elements are arranged in a planar manner although there are some upflows.

(Coordinate Values Projected Onto Any PQ Plane)

There is a case where the NWS device 1 creates a diagram such as a perspective view or an isometric diagram. In this case, the NWS device 1 transforms the three-dimensional coordinate values 101 into coordinate values 102 projected onto any PQ plane. To be more specific, by use of rays of light parallel to the line of sight from a given viewpoint, the NWS device 1 projects each element onto the PQ plane perpendicular to the line of sight, and acquires the coordinate values of the element on the PQ plane (see FIG. 3B). Needless to say, the coordinate values 102 projected onto the PQ plane is data which has the P-axis coordinate value and the Q-axis coordinate value of each element. Here, it is very difficult for an unskilled user to create the three-dimensional coordinate values 101 from the coordinate values 102 projected onto PQ plane compared to the reverse process. It takes efforts to select an appropriate solution from several solutions, if possible.

Given the above circumstances, if would be convenient if it is possible to create an outline of the three-dimensional coordinate values 101 based on one of the coordinate value 103 projected onto the XY plane, the coordinate value 104 projected onto the YZ plane, and the coordinate value 105 projected onto the XZ plane, and to complete creating the three-dimensional coordinate values 101 by supplementarily inputting the minimum amount of data necessary based on one or two of the remaining coordinate values.

(Pipe Network Model Information)

Pipe network model information (#1) 31 is described along with FIG. 4. In association with element IDs stored in an element ID section 111, pipe network model information (#1) 31 has categories in a category section 112, classes in a class section 113, upstream endpoints in an upstream endpoint section 114, downstream endpoints in a downstream endpoint section 115, connection points in a connection point section 116, upstream node IDs in an upstream node ID section 117, downstream node IDs in a downstream node ID section 118, and connection line IDs in a connection line ID section 119, all of which are stored in the pipe network model information (#1) 31.

Each of the element IDs in the element ID section 111 is an identifier which uniquely identifies an element. Note that for understandability, the element ID of a pipe contains the letter "p." in a similar manner, element IDs of a compressor, a terminal instrument, a branch, an elbow, and a valve contain the letters "C," "M," "B," "E," and "V," respectively.

The category in the category section 112 is either the "line" which means that the NWS device 1 deals with the element concerned as a line or the "node" which means that the NWS device 1 deals with the element concerned as a figure having an area.

The class in the class section 113 is the class of an element. To be more specific, the class indicates one of the "compressor," the "terminal instrument," the "pipe," the "branch," the "elbow," and the "valve" constituting the pipe network.

The upstream endpoint in the upstream endpoint section 114 indicates the three-dimensional coordinate values of the endpoint, among the two endpoints of a pipe, on the upstream side (the side nearer the compressor C12) where compressed air is incoming.

The downstream endpoint in the downstream endpoint section 115 indicates the three-dimensional coordinate values of the endpoint, among the two endpoints of a pipe, on the downstream side (the side farther from the compressor C12) where compressed air is outgoing. The upstream endpoint and the downstream endpoint are defined only for a line.

The connection point in the connection point section 116 indicates the three-dimensional coordinate values of a characteristic point of a node. One may regard as a characteristic point the three-dimensional coordinate values of the connection point between a pipe and any of a terminal instrument, a branch, and a valve. The characteristic point may be a center of gravity of an element. The connection point is defined only for a node.

Note that in FIG. 4, each of the upstream endpoint, the downstream endpoint, and the connection point has "?" as the Z-axis coordinate value. The "?" means the following:

Pipe network model information (#1) 31 is created by projecting the pipe network onto the XY plane.

For this reason, when the pipe network model information (#1) 31 is created, the coordinate value of the remaining dimension "Z-axis" excluding the "X-axis" and the "Y-axis" is unknown.

The upstream node ID in the upstream node ID section 117 indicates the element ID of the node on the upstream side, among the two nodes at which the pipe concerned is connected.

The downstream node ID in the downstream node ID section 118 indicates the element ID of the node on the downstream side, among the two nodes at which the pipe concerned is connected. The upstream node ID and the downstream node ID are defined only for a line.

The connection line ID in the connection line ID section 119 indicates the element IDs of the pipes connected to the node concerned. Three connection line IDs are defined for a branch, two connection line IDs are defined for an elbow, and one connection line ID is defined for a compressor and a terminal instrument. The connection line ID is defined only for a node.

Pipe network model information (#2) 32 is described along with FIG. 5. The configuration of the sections (columns) of the pipe network model information (#2) 32 is only different from the pipe network model information (#1) 31 (FIG. 4) in that instrument attributes are added to an instrument attribute section 120. The instrument attribute is an attribute of each element which is necessary to obtain simulation results for the pipe network.

(Instrument Attributes of Pipe)

The "Length" is a distance between the upstream endpoint and the downstream endpoint. A specific numerical value is stored at the position "· ·" in "Length=· ·."

The "Diameter" is the nominal diameter of a pipe. A specific numerical value is stored at the position "· ·" in "Diameter=· ·."

The "Material" is the material of a pipe. A specific material name or a coefficient indicating the roughness of a pipe wall is stored at the position "· ·" in "Material=· ·."

(Instrument Attributes of Compressor)

The "model" is the model of a compressor, and includes, for example, a "piston model" and a "turbine model." A string indicating a specific type is stored at the position "· ·" in "Model=· ·."

The "Discharged Air Pressure" is the rated pressure of compressed air discharged by the compressor. A specific numerical value is stored at the position "· ·" in "Discharged Air Pressure=· ·."

(Instrument Attributes of Terminal Instrument)

The "Use Pressure" is the pressure of compressed air necessary for the terminal instrument to deliver a normal function. A specific numerical value is stored at the position "· ·" in "Use Pressure=· ·."

(Instrument Attributes of Branch)

The "type" is the model of a branch. A string indicating a specific type, the number of branches, the angle of the branch etc. are stored at the position "· ·" in "Type=· ·."

(Instrument Attributes of Valve)

The "Diameter" is the nominal diameter of a valve. A specific numerical value is stored at the position "· ·" in "Diameter=· ·."

The "Type" is the model of a valve. A string indicating a specific type is stored at the position "· ·" in "Type=· ·."

The configuration of the rows of the pipe network model information (#2) 32 (FIG. 5) is different from that of the pipe network model information (#1) 31 (FIG. 4) in the following points:

The record (row) of the imaginary element P99 is deleted.

The records of the real elements P31 to P36, E38 to E41, and V37 are added, which are hidden in the imaginary element P99 in FIG. 4.

Note that in FIG. 5, some of the records identical to those in FIG. 4 are omitted because the space of the sheet is limited.

The difference between FIG. 4 and FIG. 5 is described in further detail. The pipe network model information (#1) 31 of FIG. 4 is created based on FIG. 11A. Thus, the pipe network model information (#1) 31 does not have the records of the upflow parts (real elements P31, E38, P32, V37, P33, E39, P34, E40, P35, E41, and P36) of FIG. 2. Instead, the pipe network model information (#1) 31 has the record of the imaginary element P99 which is formed by combining these upflow parts. Since FIG. 11A is a projection onto the XY plane, the Z-axis coordinate value of each record of the pipe network model information (#1) 31 is "?", which means "unknown" as described above.

Figure 11B:
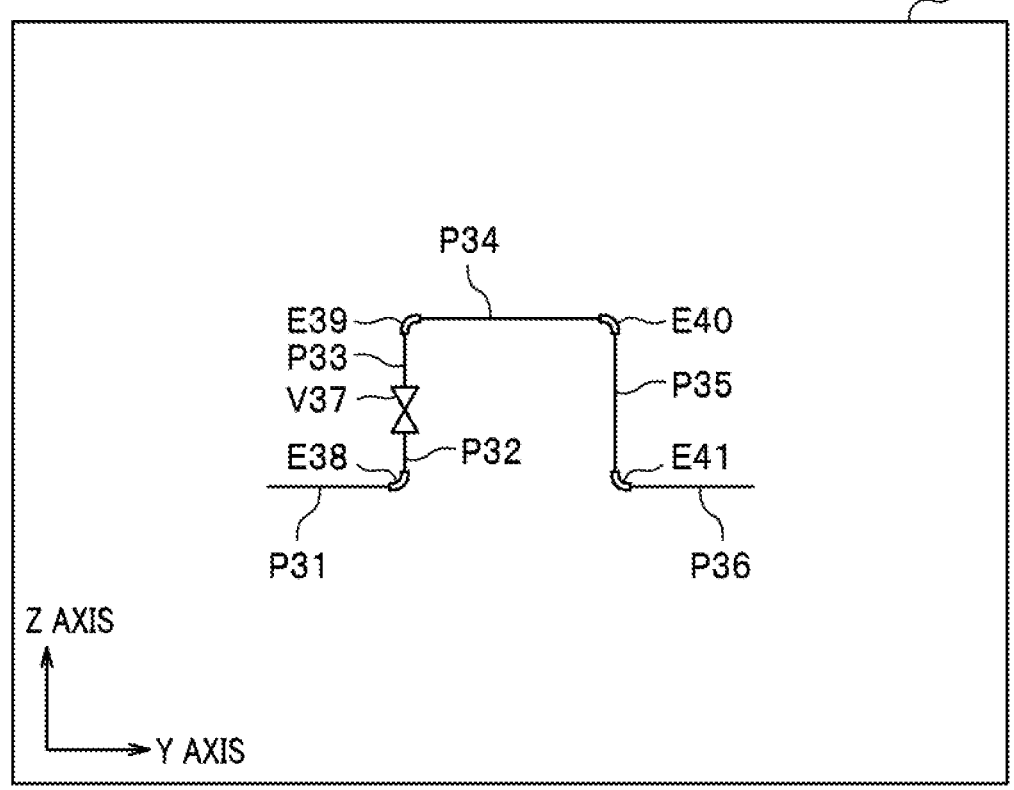
FIG. 11B is a diagram illustrating an example of a second plan view.

On the other hand, the pipe network model information (#2) 32 of FIG. 5 is created based on FIG. 11A and FIG. 11B. Hence, in comparison with FIG. 4, the row of "P99" is deleted in FIG. 5, and the records of "P31" to "P36," "E38" to "E41" and "V37" are added instead. Since FIG. 11B is a projection onto the YZ plane, the Z-axis coordinate value of each record of the pipe network model information (#2) 32 has a specific numerical value. This is indicated with "0" and "Z." The letter "Z" represents a specific number other than "0."

Pipe network model information (#3) 33 is described along with FIG. 6. The configuration of the sections of the pipe network model information (#3) 33 is different from that of the pipe network model information (#2) 32 (FIG. 5) only in that an analysis condition section 121 and a simulation result section 122 are added. Note that in FIG. 6, some of the sections identical to those in FIG. 5 are omitted because the space of the sheet is limited. The analysis conditions in the analysis condition section 121 are operating values of a given element necessary to obtain simulation results of the pipe network. The operating values do not include measurement values such as the value of a flow rate which requires efforts to measure with a flow rate meter. The simulation results in the simulation result section 122 are results of simulating fluid characteristics of the pipe network. The configuration of the records of the pipe network model information (#3) 33 is the same as that of the pipe network model information (#2) 32 (FIG. 5).

(Analysis Conditions of Compressor)

"Temperature" is the temperature of compressed air discharged from the compressor. A specific numerical value is stored at the position "· ·" in "Temperature=· ·."

"Pressure" is the pressure of compressed air discharged from the compressor. A specific numerical value is stored at the position "· ·" in "Pressure=· ·."

"Relative Humidity" is the relative humidity of compressed air discharged from the compressor. A specific numerical value is stored at the position "· ·" in "Relative Humidity=· ·."

(Analysis Conditions of Terminal Instrument)

"Use Rate of Air" is the volume of compressed air used per unit time by the terminal instrument. A specific numerical value is stored at the position "· ·" in "Use Rate of Air= · ·."

"Use Pressure" is the pressure of compressed air used by the terminal instrument. A specific numerical value is stored at the position "· ·" in "Use Pressure=· ·."

(Simulation Results)

Simulation results are fluid characteristics defined for each element.

"Flow Rate" is the volume of compressed air flowing per unit time through the upstream endpoint, the downstream endpoint, or the connection point of the element concerned. A specific numerical value is stored at the position "· ·" in "Flow Rate=· ·."

"Pressure Loss" is the pressure loss per unit length of the element concerned. A specific numerical value is stored at the position "· ·" in "Pressure Loss=· ·."

"Temperature" is the temperature of the element concerned. A specific numerical value is stored at the position "· ·" in "Temperature=· ·."

"Pressure" is the pressure of compressed air flowing through the connection point of the element concerned. A specific numerical value is stored at the position "· ·" in "Pressure=· ·."

(Simulation Method)

By referring to the pipe network model information (#3) 33 (FIG. 6), the NWS device 1 can obtain the following:

(1) Information obtained from the coordinate values of an element

Connection relationship and positional relationship between elements

Angle at which a pipe branches or meets another pipe

Angle at which a pipe turns its direction at an elbow (2) Instrument Attributes

Length, diameter, and material of each pipe

Model and discharged air pressure of the compressor

Use Pressure of a terminal instrument

Type of a branch

Diameter and type of a valve (3) Analysis Conditions

Temperature, pressure, and relative humidity of the compressor

Use rate of air and use pressure of a terminal device

Based on the above sets of information, the NWS device 1 outputs simulation results for each element. Suppose, for example, that "simulation results=F (coordinate values of a given element, instrument attributes of the element, and analysis conditions of the element)." The NWS device inputs the variables "coordinate values of an element," the variables "instrument attributes," and the variables "analysis conditions," and acquires variables "simulation results" outputted by the function "F," Such function F has various known specific examples.

(Overall Processing Procedure)

Figure 7:
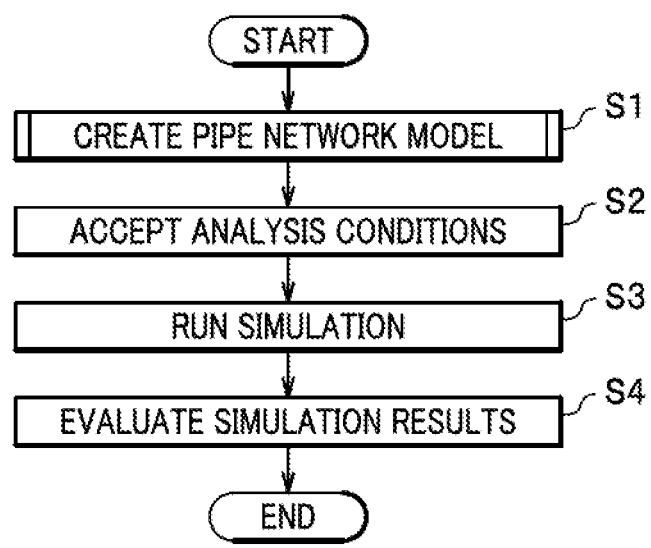
FIG. 7 is a flowchart for overall processing procedures.

An overall processing procedure is described along with FIG. 7.

At step S1, the model information creation unit 21 of the NWS device 1 creates the pipe network model information. Although the detail of step S1 is described later, the model information creation unit 21 has completed creating the pipe network model information (#2) 32 (FIG. 5) and stored the pipe network model information (#2) 32 in the auxiliary storage device 15 at the end of step S1.

At step S2, the simulation running unit 22 of the NWS device 1 accepts analysis conditions. To be more specific, firstly, the simulation running unit 22 displays the pipe network model information (#2) 32 (FIG. 5) on the output device 13. The simulation running unit 22 then adds the analysis condition section 121 on the right end, and accepts the analysis conditions to be inputted in the analysis condition section 121 by a user.

Secondly, the simulation running unit 22 stores the pipe network model information (#2) 32 (FIG. 5) with accepted analysis conditions in the auxiliary storage device 15.

At step S3, the simulation running unit 22 runs simulation. To be more specific, firstly, the simulation running unit 22 accepts an input of "Running Instruction" (e.g. to press a predetermined button on the screen) by the user through the input device 12.

Secondly, the simulation running unit 22 creates the pipe network model information (#3) 33 (FIG. 6) and stores the pipe network model information (#3) 33 in the auxiliary storage device 15 by use of the above described function F.

Figure 13A:
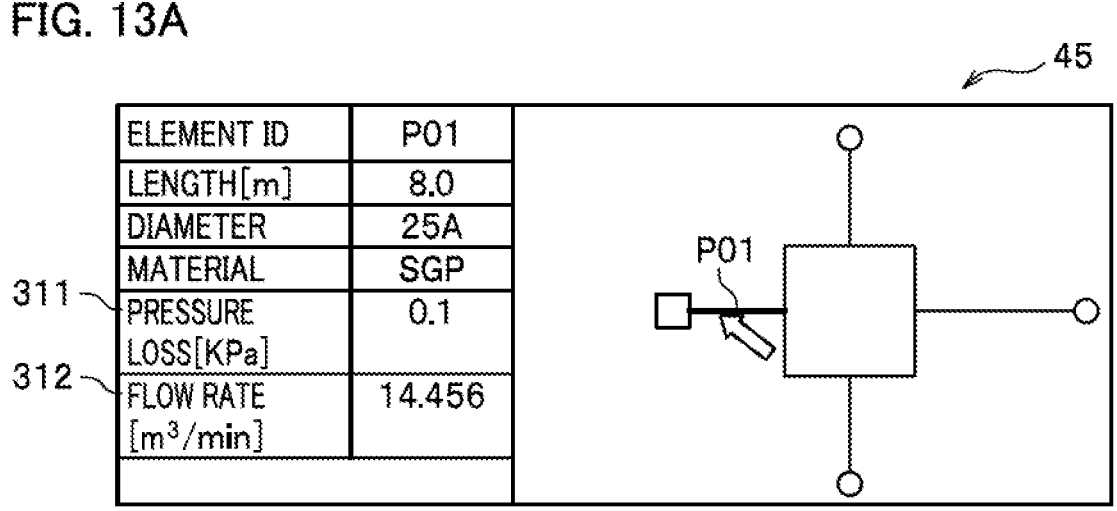
FIG. 13A is a diagram illustrating an example of a simulation result display screen.

Thirdly, the simulation running unit 22 displays a simulation result display screen 45 (FIG. 13A) on the output device 13, and accepts any element (here, P01) selected by the user.

Fourthly, among the simulation results in the pipe network model information (#3) 33, the simulation running unit 22 displays the value of the pressure loss and the value of the flow rate corresponding to the selected element in a pressure loss section 311 and a flow rate section 312, respectively. Needless to say, the temperature or the pressure may be displayed.

Figure 13B:
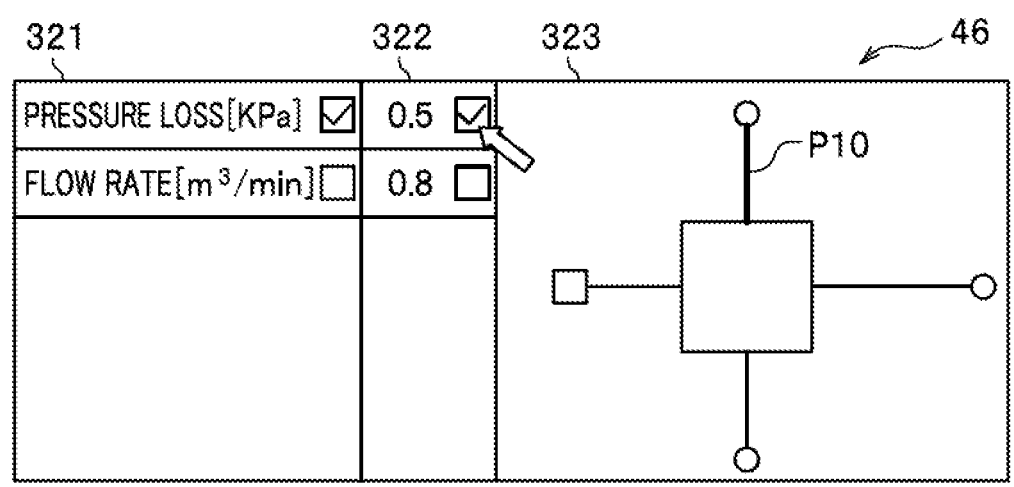
FIG. 13B is a diagram illustrating an example of an evaluation screen.

At step S4, the simulation running unit 22 evaluates the simulation results. To be more specific, firstly, the simulation running unit 22 displays an evaluation screen 46 (FIG. 13B) on the output device 13. The simulation running unit 22 then accepts selection of one evaluation item by the user from the candidates in an evaluation item section 321, and selection of one evaluation threshold value by the user from the candidates in an evaluation threshold value section 322.

Secondly, the simulation running unit 22 searches the simulation result section 122 of the pipe network model information (#3) 33 (FIG. 6) with the selected evaluation item (e.g. "Pressure Loss") and evaluation threshold value as search keys. The simulation running unit 22 then acquires the element IDs of the records whose numerical values of the selected evaluation item is equal to or more than the selected evaluation threshold value. Although the search condition here is that the numerical values are equal to or more than the evaluation threshold value, this is a mere example, of course. It suffices that the simulation running unit 22 acquires the element ID of a record based on the quantitative relationship between the numerical value and the evaluation threshold value of the evaluation item.

Thirdly, the simulation running unit 22 judges the elements which are identified using the acquired element IDs as in an abnormal status. The simulation running unit 22 highlights the elements (here P10) judged as in the abnormal status (section 323).

After that, the overall processing procedure is finished.

(Processing Procedures of Creating Pipe Network Model Information)

Figure 8:
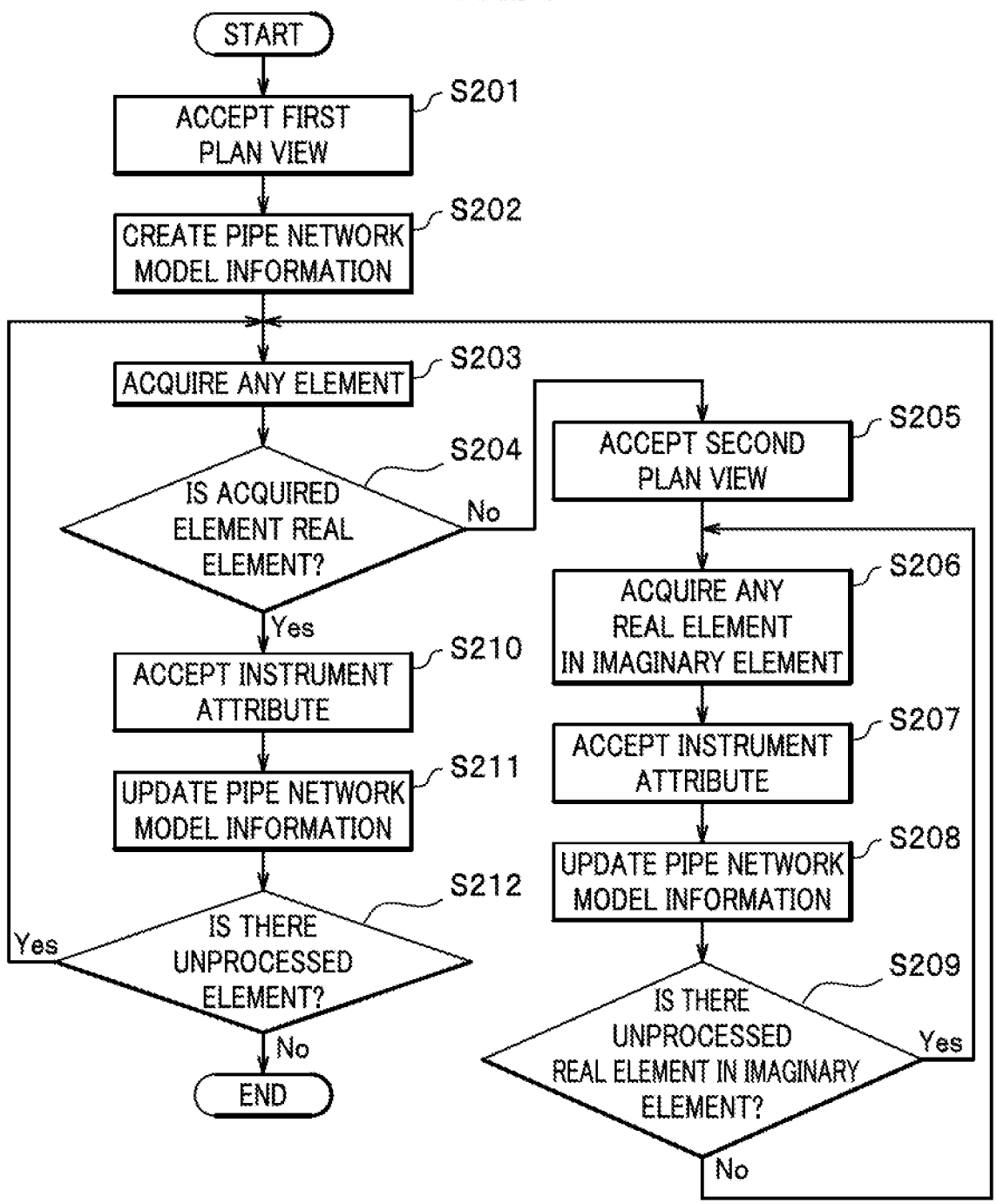
FIG. 8 is a flowchart for processing procedures of creating pipe network model information according to a first embodiment.

Processing procedures of creating the pipe network model information are described along with FIG. 8. The processing procedures of creating the pipe network model information show details of step S1 of the overall processing procedure. Note that the processing procedures of creating the pipe network model information are partly different from a second embodiment and a third embodiment to be described later (the difference is described later in detail).

At step S201, the model information creation unit 21 of the NWS device 1 accepts a first plan view. To be more specific, firstly, the model information creation unit 21 accepts an input of a first plan view 41 (FIG. 11A) by the user through the input device 12 (scanner). The first plan view 41 is a projection of the pipe network model onto, for example, the XY plane.

Secondly, the model information creation unit 21 displays the first plan view on the output device 13. The first plan view displayed here appears as in FIG. 11A, of course.

Note that, instead of inputting the first plan view 41 by use of a scanner, the user may input the first plan view 41 with the X-axis coordinate value and the Y-axis coordinate value of each element by use of e.g. a keyboard. In any case, the data inputted at this stage is "first plane information."

At step S202, the model information creation unit 21 creates the pipe network model information (#1) 31 (FIG. 4). To be more specific, the model information creation unit 21 creates the pipe network model information (#1) 31 based on the first plan view 41 accepted at step S201, and stores the pipe network model information (#1) 31 in the auxiliary storage device 15. If the model information creation unit 21 accepts the first plan view by use of a scanner, the model information creation unit 21 extracts an element from image data, determines the class of the extracted element (e.g. "branch") using the shape of the element, and determines the X-axis coordinate value and the Y-axis coordinate value of the extracted element using the positional information on the element. If the coordinate values are accepted by use of a keyboard, such an extraction is unnecessary. In any case, however, the model information creation unit 21 uniquely sets "?" to the Z-axis coordinate values of all elements.

At step S203, the model information creation unit 21 acquires any element. To be more specific, the model information creation unit 21 accepts selection of any unprocessed element by the user (moving the cursor thereover) in the first plan view 41 (FIG. 11A).

At step S204, the model information creation unit 21 judges whether or not the acquired element is a real element. The user knows whether or not the element selected at step S203 is a real element or an imaginary element, and is capable of inputting information indicating "real element" or "imaginary element" by use of the input device 12. The model information creation unit 21 proceeds to step S210 if the user inputs "real element"(step S204 "Yes"). If the user inputs "imaginary element" (step S204 "No"), the processing proceeds to step S205.

At step S205, the model information creation unit 21 accepts a second plan view. To be more specific, firstly, the model information creation unit 21 accepts an input of the second plan view 42 (FIG. 11B) by the user through the input device 12 (scanner). The second plan view 42 is a projection of the imaginary element of the pipe network model acquired at step S203 onto, for example, the YZ plane.

Secondly, the model information creation unit 21 displays the second plan view 42 on the output device 13. The second plan view 42 displayed here appears as in FIG. 11B, of course.

Note that, instead of inputting the second plan view 42 by use of a scanner, the user may input the second plan view 42 with the Y-axis coordinate value and the Z-axis coordinate value of each element by use of e.g. a keyboard. In any case, the data inputted at this stage is "second plane information."

At step S206, the model information creation unit 21 acquires any real element in an imaginary element. To be more specific, the model information creation unit 21 accepts selection of any unprocessed real element by the user (moving the cursor thereover) in the second plan view 42 (FIG. 11B).

At step S207, the model information creation unit 21 accepts an instrument attribute. To be more specific, firstly, the model information creation unit 21 displays an instrument attribute input screen 44 (FIG. 12B) on the output device 13.

Secondly, the model information creation unit 21 accepts an input of the numerical value of a length by the user into a length section 301.

Thirdly, the model information creation unit 21 accepts selection of the numerical value of a nominal diameter by the user from the candidates in the pull-down menu displayed in a diameter section 302.

Fourthly, the model information creation unit 21 accepts selection of a string indicating the material by the user from the candidates in the pull-down menu displayed in a material section 303.

At step S208, the model information creation unit 21 updates the pipe network model information (#1) 31 (FIG. 4). To be more specific, based on the accepted second plan view 42 and the instrument attribute, the model information creation unit 21 executes the following processes:
(1) Reading the pipe network model information (#1) 31 from the auxiliary storage device 15.
(2) Deleting the record of the pipe P99 with the Z-axis coordinate values "?" unchanged.
(3) Adding the records of the pipes P31 to 36, the elbows E38 to E41, and the valve V37.
(4) Updating the Z-axis coordinate values "?" of the upstream endpoints and the downstream endpoints or of the connection points in the added records using specific numerical values. Here, the model information creation unit 21 decides to choose "0" or "Z" as a specific numerical value. As described above, "Z" collectively represents values other than "0," and all of the "X" do not indicate the same value.
(5) Adding the instrument attribute section 120 and storing the instrument attribute.
(6) Storing the records of the pipe network model information (#1) 31 (FIG. 4) in the auxiliary storage device 15 as the records of the pipe network model information (#2) 32 (FIG. 5) after the above processes of (2) to (5) finish.

At step S209, the model information creation unit 21 judges whether or not there is an unprocessed real element in the imaginary element. To be more specific, the model information creation unit 21 returns to step S206 if there is an unprocessed real element in the imaginary element acquired at step S203 (step S209 "Yes"). If there is no unprocessed real element (step S209 "No"), the processing returns to step S203.

Figure 12A:
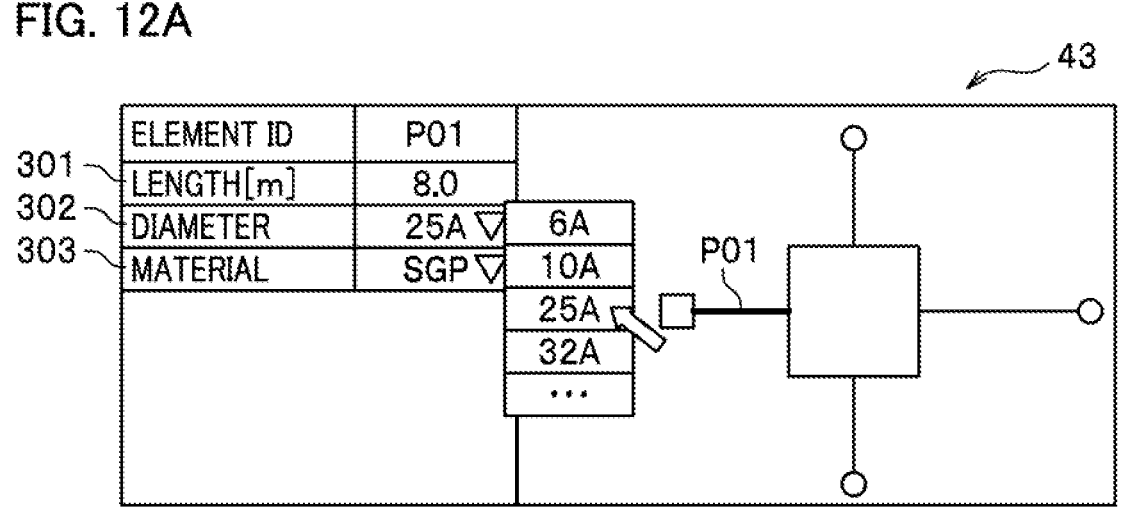
FIGS. 12A and 12B are diagrams illustrating an example of an instrument attribute input screen according to the first embodiment.
Figure 12B:
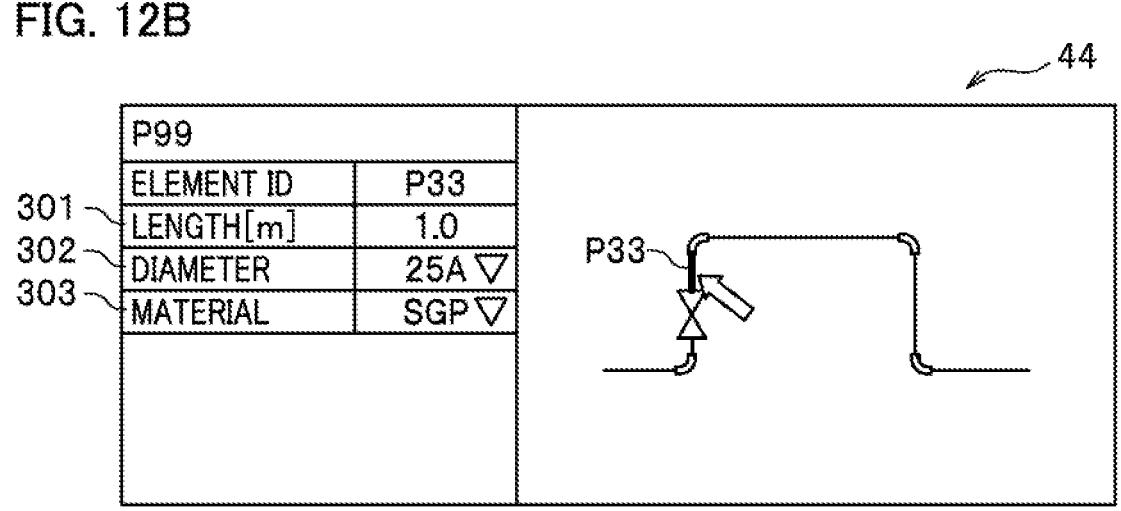

At step S210, the model information creation unit 21 accepts an instrument attribute. To be more specific, firstly, the model information creation unit 21 displays an instrument attribute input screen 43 (FIG. 12A) on the output device 13. The real element (here, P01) selected at step S203 is highlighted in the instrument attribute input screen 43 (FIG. 12A).

Secondly, the model information creation unit 21 accepts an input of the numerical value of a length by the user into the length section 301.

Thirdly, the model information creation unit 21 accepts selection of the numerical value of a nominal diameter by the user from the candidates in the pull-down menu displayed in the diameter section 302.

Fourthly, the model information creation unit 21 accepts selection of a string indicating the material by the user from the candidates in the pull-down menu displayed in the material section 303.

At step S211, the model information creation unit 21 updates the pipe network model information (#1) 31 (FIG. 4). To be more specific, the model information creation unit 21 executes the following processes:
(1) Reading the pipe network model information (#1) 31 from the auxiliary storage device 15.
(2) Updating the Z-axis coordinate values "?" of the upstream endpoint and the downstream endpoint or of the connection points in the record of the real element selected at step S203 with "0."
(3) Adding the instrument attribute section 120 and storing the accepted instrument attribute.
(4) Storing the records of the pipe network model information (#1) 31 (FIG. 4) in the auxiliary storage device 15 as the records of the pipe network model information (#2) 32 (FIG. 5) after the above processes of (2) and (3) finish.

At step S212, the model information creation unit 21 judges whether or not there is an unprocessed element. To be more specific, the model information creation unit 21 returns to step S203 if there is an unprocessed element (step S212 "Yes"). If there is no unprocessed element (step S212 "No"), the processing procedures of creating the pipe network model information finish.

Second Embodiment

At steps S206 and S207 in the processing procedures of creating the pipe network model information according to the first embodiment, it is convenient if the user can easily input upflow parts. The main factors of determining the pressure loss of a pipe path which has no branches and a constant diameter are: the total length of the pipe path, the total number of elbows in the pipe path, and the total number of valves in the pipe path. However, the positional relationship between the pipes and the terminal instruments does not greatly affect the pressure loss. In the second embodiment, the user inputs simplified information which is a collection of the instrument attributes of the elements in a whole imaginary element instead of breaking up an imaginary element into real elements and collecting the instrument attributes.

(Processing Procedures of Creating Pipe Network Model Information)

Figure 9:
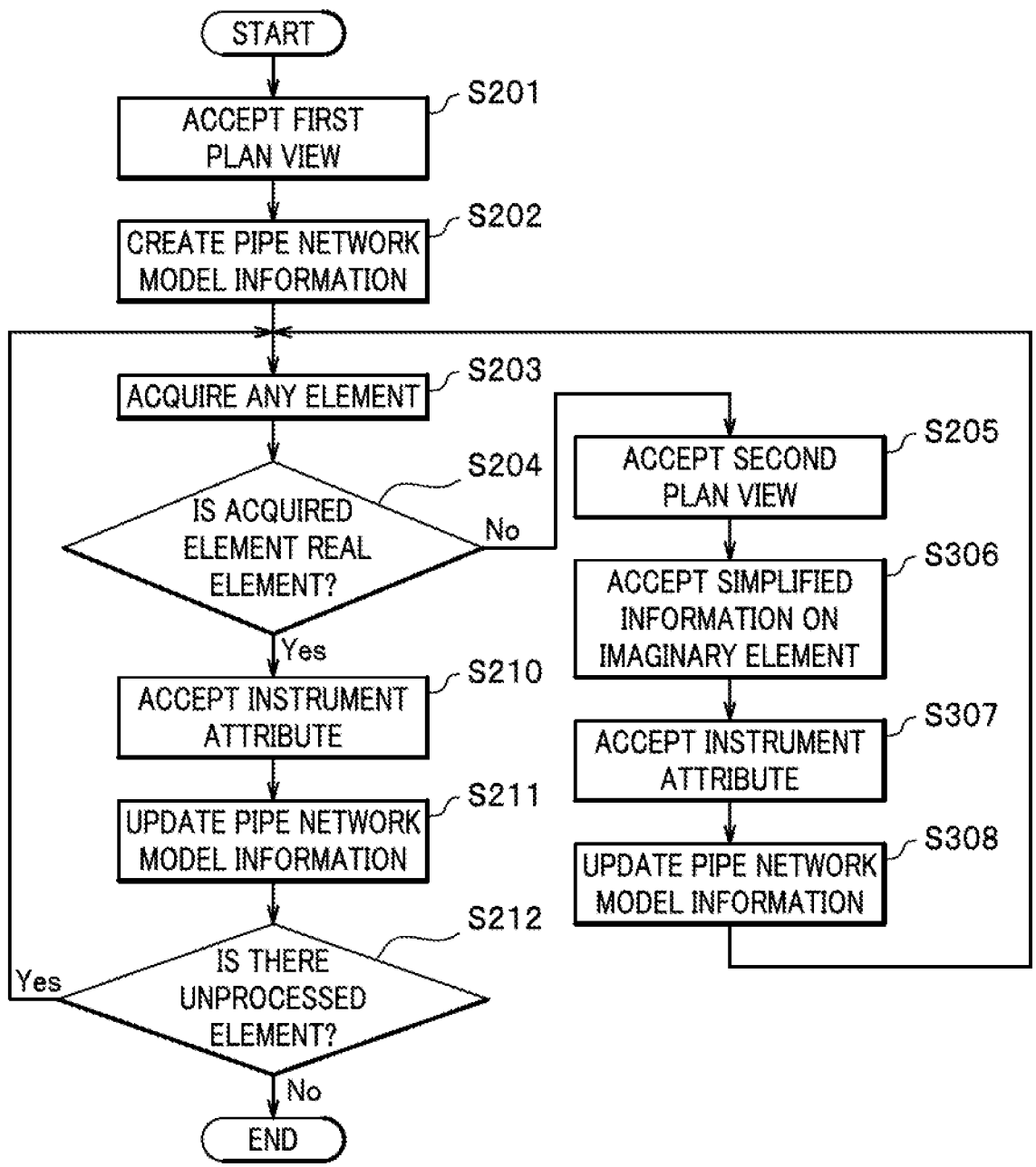
FIG. 9 is a flowchart for processing procedures of creating pipe network model information according to a second embodiment.

Processing procedures of creating the pipe network model information are described along with FIG. 9. Steps S201 to S205 and S210 to S212 are the same as those of the first embodiment.

At step S306, the model information creation unit 21 accepts the simplified information on an imaginary element. To be more specific, firstly, the model information creation unit 21 displays a simplified information input screen 47 (FIG. 14A) for the imaginary element selected at step S203 on the output device 13.

Secondly, the model information creation unit 21 accepts an input of the total length of the selected imaginary element, by the user into a pipe total length section 318. The total length of the imaginary element mentioned here is the length of the imaginary element P99. The user knows that the total length of the imaginary element P99 is the sum of the lengths of the elements P31 to P36. Hence, the user inputs the sum.

Thirdly, the model information creation unit 21 accepts an input of the total number of elbows in the selected imaginary element, by the user into an elbow number section 319.

Fourthly, the model information creation unit 21 accepts an input of the total number of valves in the selected imaginary element, by the user into a valve number section 313.

Figure 14A:
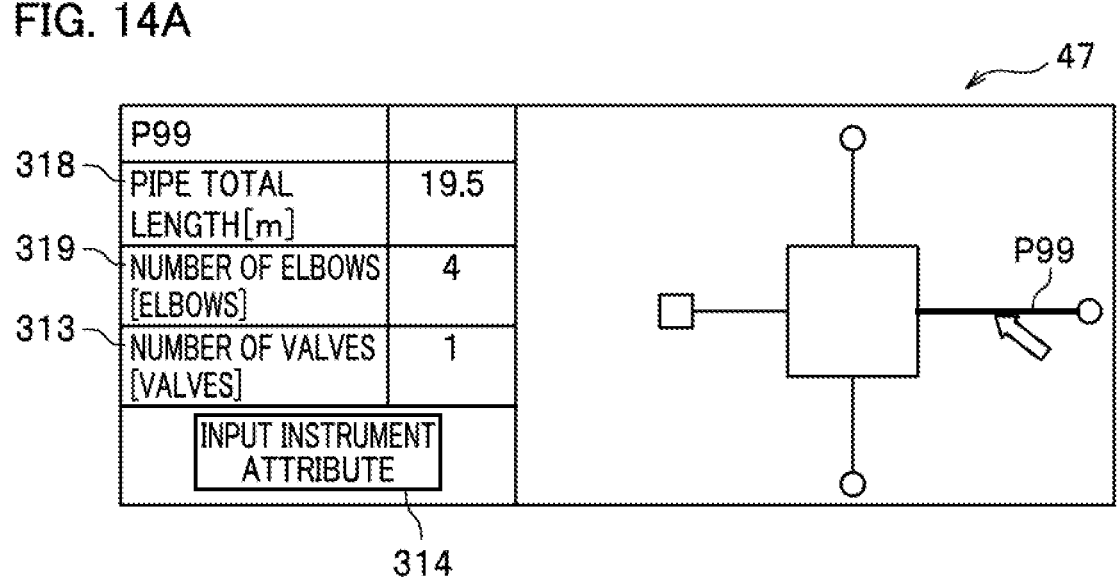
FIG. 14A is a diagram illustrating an example of a simplified information input screen according to the second embodiment.

At step S307, the model information creation unit 21 accepts an instrument attribute. To be more specific, the model information creation unit 21 accepts pressing of an "Input Instrument Attribute" button 314 by the user (FIG. 14A).

Secondly, the model information creation unit 21 displays an instrument attribute input screen 48 (FIG. 14B) on the output device 13.

Thirdly, the model information creation unit 21 accepts selection of the numerical value of a nominal diameter by the user from the candidates in the pull-down menu displayed in a diameter section 315.

Fourthly, the model information creation unit 21 accepts selection of a string indicating the material by the user from the candidates in the pull-down menu displayed in a material section 316.

Fifthly, the model information creation unit 21 accepts selection of a string indicating the type of the valve by the user from the candidates in the pull-down menu displayed in a valve type section 317.

Note that even when one imaginary element has multiple real elements, the model information creation unit 21 executes the process at step S307 only once for the imaginary element. In other words, in this example, the model information creation unit 21 supposes that the diameters of all pipes the imaginary element P99 has are "25A." Likewise, the model information creation unit 21 supposes that the materials of all pipes the imaginary element P99 has are "SGP (carbon steel pipe for ordinary piping)," and the types of all valves the imaginary element P99 has are "ON/OFF valve." Thus, the input load experienced by the user is reduced.

At step S308, the model information creation unit 21 updates the pipe network model information (#1) 31 (FIG. 4). To be more specific, based on the accepted second plan view 42, the simplified information, and the instrument attribute, the model information creation unit 21 updates the pipe network model information (#1) 31, and stores the pipe network model information (#1) 31 in the auxiliary storage device 15 as the pipe network model information (#2) 32 (FIG. 5). In FIG. 5, the model information creation unit 21 adds the records of "E38" to "E41" and "737" based on the second plan view 42, the total number "4" of elbows, and the total number "1" of valves. Further, the model information creation unit 21 adds the records of "P31" to "P36" based on the second plan view 42 and the imaginary element P99 divided into six elements. The record of "P99" is deleted, of course.

Third Embodiment

The input load on the user at steps S306 and S307 of the second embodiment is greatly reduced compared to the first embodiment. However, the user has to input numerical values etc. in any case. Given the above, it is more advantageous if it is possible to completely omit the process of inputting numerical values etc. In the third embodiment, the user has only to select the shape pattern of a pipe.

(Processing Procedures of Creating Pipe Network Model Information)

Figure 10:
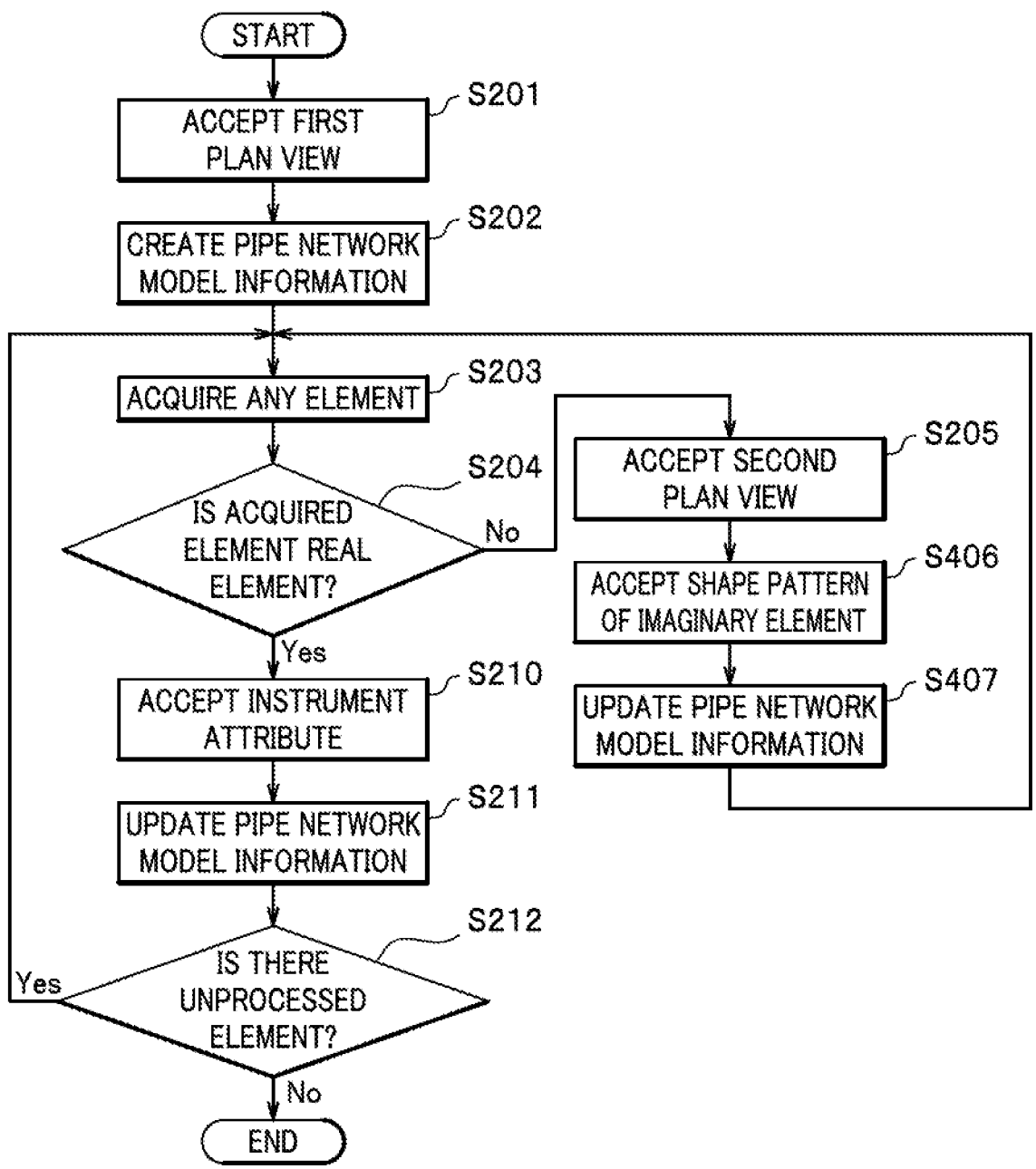
FIG. 10 is a flowchart for processing procedures of creating pipe network model information according to a third embodiment.

Processing procedures of creating the pipe network model information are described along with FIG. 10. Steps S201 to S205 and S210 to S212 are the same as those of the first embodiment.

Figure 15:
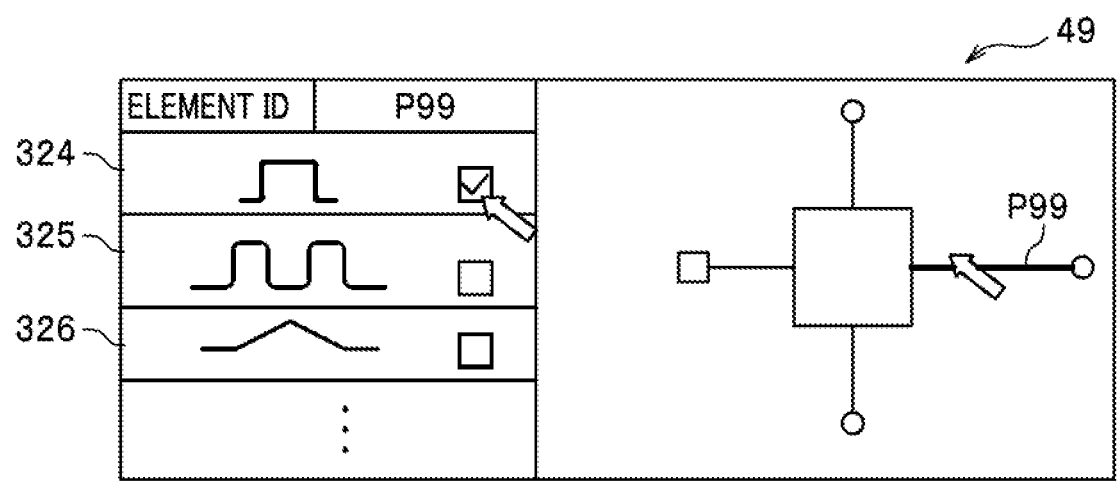
FIG. 15 is an example of a shape pattern selection screen according to the third embodiment.

At step S406, the model information creation unit 21 accepts the shape pattern of an imaginary element. To be more specific, firstly, the model information creation unit 21 displays a shape pattern selection screen 49 (FIG. 15) for the imaginary element selected at step S203 on the output device 13. The auxiliary storage device 15 stores pattern information (not illustrated).

Figure 14B:
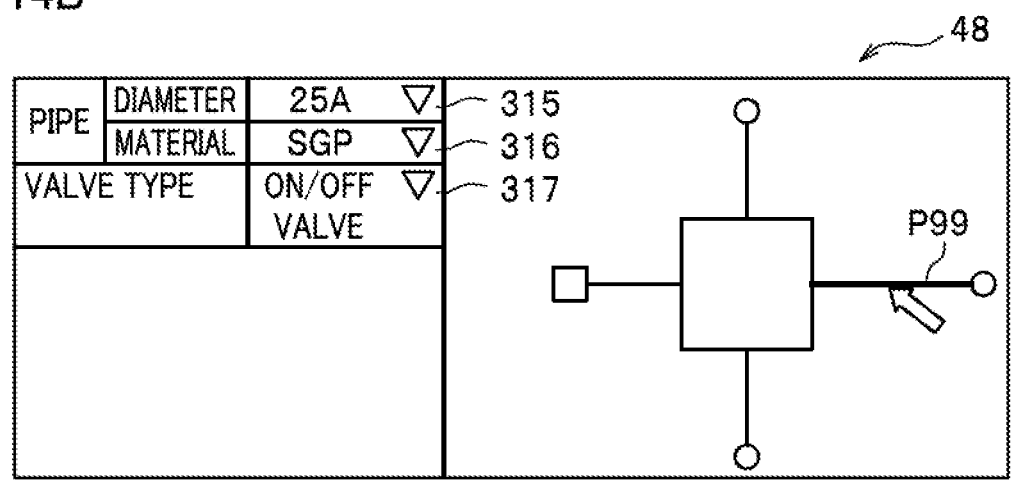
FIG. 14B is a diagram illustrating an example of an instrument attribute input screen according to the second embodiment.

In association with the shape pattern which is a schematic diagram for the shape of the imaginary element, the pattern information stores the total length of the imaginary element, the total number of elbows in the imaginary element, the total number of valves in the imaginary element, the nominal diameters of the pipes in the imaginary element, the materials of the pipes, and the types of the valves. These sets of information form a template for the information which should be inputted by the user in the simplified information input screen 47 (FIG. 14A) and the instrument attribute input screen 48 (FIG. 14B). The model information creation unit 21 displays the candidates for the shape pattern in a section 324 to a section 326 . . . .

Secondly, the model information creation unit 21 accepts selection of one shape pattern by the user from the candidates. To be more specific, the user selects from these candidates a shape pattern similar to the shape of the imaginary element selected at step S203.

At step S407, the model information creation unit 21 updates the pipe network model information (#1) 31 (FIG. 4). To be more specific, based on the accepted second plan view 42, the selected shape pattern, and the information associated with the shape pattern, the model information creation unit 21 updates the pipe network model information (#1) 31, and stores the pipe network model information (#1) 31 in the auxiliary storage device 15 as the pipe network model information (#2) 32 (FIG. 5).

(Third Plan View)

Back to FIG. 2, suppose, for example, that the pipe P10 is also an imaginary element which includes upflow parts. In this case, it is impossible to know the positional information and the instrument attributes of the real elements included in the two imaginary elements P99 and P10 without the XZ plan view as well as the XY plan view and the YZ plan view. In the processing procedures of creating the pipe network model information, the model information creation unit 21 can accept the XZ plan view as the second plan view 42. Moreover, the model information creation unit 21 can accept the YZ plan view as the second plan view and the XZ plan view as the third plan view if the double loop in the processing procedures of creating the pipe network model information is replaced with a triple loop.

(Order of Priority of Plan Views)

The total number of pipes which appear on the XY plan view 41 (FIG. 11A) is "12." Suppose a YZ plan view onto which the entire pipe network model of FIG. 2 is projected. It turns out that the total number of pipes which appear on the YZ plan view is "5." In the same manner, suppose an XZ plan view onto which the entire pipe network model of FIG. 2 is projected. It turns out that the total number of pipes which appear on the XZ plan view is "3." These total numbers include the number of real elements and the number of imaginary elements. The model information creation unit 21 may determine as the "first plan view" one of the XZ plan view, the YZ plan view, and the XZ plan view with the largest apparent total number of pipes. After that, at step S201, the model information creation unit 21 may prompt the user to input the determined first plan view 41. This makes it possible to minimize the total processing time.

Effects of Embodiments

The NWS device 1 of the embodiment has the following effects:

(1) The user is allowed to easily create a three-dimensional network model even if the user is unskilled at operating three-dimensional coordinate values.

(2) The user is allowed to easily simulate the characteristics of a network.

(3) The user is allowed to easily input e.g. positional information on exceptional upflow parts.

(4) The user is allowed to easily input e.g. positional information on exceptional upflow parts based only on the apparent shape.

(5) The user is allowed to reduce the amount of work by reading an existing plan view without modifications.

(6) The user is allowed to shorten time taken to create a pipe network model if the user knows the plan view to be read first.

(7) The user is allowed to visually recognize a part in an abnormal status easily.

(8) The user is allowed to simulate widely used pipe networks which supply compressed air.

Note that the present invention is not limited to the embodiments described above, and includes various modified examples. For example, the foregoing embodiments are provided to allow the reader to easily understand the details of the present invention. The embodiments are not necessarily limited to one which includes all of the described constituents. Moreover, it is possible to replace some of the constituents of an embodiment with corresponding constituents of another embodiment. In addition, it is possible to add a constituent of an embodiment to a configuration of another embodiment. Furthermore, it is possible to add a constituent of an embodiment to a part of the configuration of another embodiment, to remove a part of the configuration of an embodiment, and to replace a part of the configuration of an embodiment with a constituent of another embodiment.

Additionally, at least one of the above-described constituent, the function, the processing unit, the processing method, etc. may be hardware designed in the form of, for example, an integrated circuit. Further, the above-described constituent, the function, etc. may be software wherein a processor interprets and executes programs for their functions. Information on programs, tables, files, etc. for the functions can be stored in recording media such as a memory, a hard disk, and an SSD (solid state drive) or in storage media such as an IC card, an SD card, and a DVD.

What is more, the indicated control lines and the information lines are only those thought, to be necessary for the purpose of explanation. The embodiments do not necessarily indicate all control lines and information lines of a product. One may consider that almost all constituents are actually connected to one another.

REFERENCE SIGNS LIST 1 network simulation device
11 central control device
12 input device
13 output device
14 main storage device
15 auxiliary storage device
21 model information creation unit
22 simulation running unit
31, 32, 33 pipe network model information

The invention claimed is:

1. A network simulation device comprising:
a storage unit which stores network model information which stores three-dimensional coordinate values of each of elements constituting a network; and
a control unit programmed to execute a program stored in the storage unit, and when the program is executed, the control unit
accepts an input of first plane information being positional information on the network projected onto a coordinate plane having any two dimensions out of three dimensions as coordinate axes,
creates the network model information which defines a coordinate value of the remaining one dimension as unknown based on the accepted first plane information,
accepts selection of an element having the coordinate value defined as unknown, by a user from the elements which appear in the first plane information,
accepts an input of second plane information being positional information on the network projected onto a coordinate plane having any two dimensions including the remaining one dimension as coordinate axes, and
determines a numerical value of the coordinate value defined as unknown of the selected element in the created network model information based on the accepted second plane information,
outputs updated network model information of the elements, wherein the elements are one of actual pipes or actual wires that make up the network; and
creates a network model of actual pipes or actual wires using the outputs of the updated network model information of the elements without the need for three-dimensional processing.

2. The network simulation device according to claim 1, wherein
the control unit
accepts an input of an attribute of the element by the user,
accepts an input of an operating value of the given element by the user, and
outputs for each element a result of simulating a numerical value indicating a characteristic of the network based on the accepted attribute, the accepted operating value, and the network model information.

3. The network simulation device according to claim 2, wherein
the control unit accepts an input of a total length of the selected element and a total number of instruments in the selected element by the user, while accepting an input of the second plane information.

4. The network simulation device according to claim 3, wherein
the storage unit stores pattern information which stores the total length of the selected element and the total number of instruments in the selected element in association with a shape pattern of each of a plurality of the elements, and
the control unit
accepts selection of the shape pattern which matches the selected element, by the user, while accepting the total length of the selected element and the total number of instruments in the selected element, and
acquires the total length of the selected element and the total number of instruments in the selected element corresponding to the selected shape pattern.

5. The network simulation device according to claim 4, wherein
the control unit accepts an input of the first plane information and the second plane information as image data.

6. The network simulation device according to claim 5, wherein
the control unit determines as the first plane information the coordinate plane with the largest total number of the elements which appear when the network is projected.

7. The network simulation device according to claim 6, wherein
the control unit
accepts an input of a threshold value by the user, for the numerical value indicating the characteristic,
identifies the element in an abnormal status based on a quantitative relationship between the numerical value indicating the characteristic and the accepted threshold value, and
highlights the identified element.

8. The network simulation device according to claim 7, wherein
the network is a pipe network which supplies compressed air,
the attribute and the operating value do not include a flow rate value, and
the characteristic includes the flow rate value and a pressure loss.

9. A network simulation method of a network simulation device, comprising:
causing a storage unit of the network simulation device to store network model information which stores three-dimensional coordinate values of each of elements constituting a network; and
causing a control unit of the network simulation device
to accept an input of first plane information being positional information on the network projected onto a coordinate plane having any two dimensions out of three dimensions as coordinate axes,
to create the network model information which defines a coordinate value of the remaining one dimension as unknown based on the accepted first plane information,
to accept selection of an element having the coordinate value defined as unknown by a user from the elements which appear in the first plane information,
to accept an input of second plane information being positional information on the network projected onto a coordinate plane having any two dimensions including the remaining one dimension as coordinate axes, and to determine a numerical value of the coordinate value defined as unknown of the selected element in the created network model information based on the accepted second plane information, to output updated network model information of the elements, wherein the elements are one of actual pipes or actual wires that make up the network; and to create a network model of actual pipes or actual wires using the outputs of the updated network model information of the elements without the need for three-dimensional processing.

10. A non-transitory computer-readable medium storing a network simulation program which causes a network simulation device to execute a method, comprising:

causing a storage unit of the network simulation device to store network model information which stores three-dimensional coordinate values of each of elements constituting a network; and causing a control unit of the network simulation device to execute processing of accepting an input of first plane information being positional information on the network projected onto a coordinate plane having any two dimensions out of three dimensions as coordinate axes, creating the network model information which defines a coordinate value of the remaining one dimension as unknown based on the accepted first plane information, accepting selection of an element having the coordinate value defined as unknown by a user from the elements which appear in the first plane information, accepting an input of second plane information being positional information on the network projected onto a coordinate plane having any two dimensions including the remaining one dimension as coordinate axes, and determining a numerical value of the coordinate value defined as unknown of the selected element in the created network model information based on the accepted second plane information, outputting updated network model information of the elements, wherein the elements are one of actual pipes or actual wires that make up the network; and creating a network model of actual pipes or actual wires using the outputs of the updated network model information of the elements without the need for three-dimensional processing.

* * * * *